(12) United States Patent
Maitrasse et al.

(10) Patent No.: US 9,012,589 B2
(45) Date of Patent: Apr. 21, 2015

(54) PLASTICIZERS FOR AQUEOUS SUSPENSIONS OF MINERAL PARTICLES AND HYDRAULIC BINDER PASTES

(75) Inventors: Philippe Maitrasse, Chilleurs aux Bois (FR); Bruno Pellerin, Avon (FR); Frederic Leising, Avilly Saint Leonard (FR); Loic Lemiegre, Rennes (FR); Nicolas Noiret, Saint Sulpice la Foret (FR); Nathanael Olivi, Dijon (FR)

(73) Assignee: Chryso, Issy les Moulineaux (FR)

( * ) Notice: Subject to any disclaimer, the term of this patent is extended or adjusted under 35 U.S.C. 154(b) by 423 days.

(21) Appl. No.: 13/262,507

(22) PCT Filed: Mar. 31, 2010

(86) PCT No.: PCT/FR2010/050614
§ 371 (c)(1),
(2), (4) Date: Dec. 14, 2011

(87) PCT Pub. No.: WO2010/112775
PCT Pub. Date: Oct. 7, 2010

(65) Prior Publication Data
US 2012/0073475 A1  Mar. 29, 2012

(30) Foreign Application Priority Data
Apr. 2, 2009  (FR) ..................... 09 52132

(51) Int. Cl.
| C08G 77/24 | (2006.01) |
| C07F 9/22 | (2006.01) |
| C04B 24/32 | (2006.01) |
| C04B 24/24 | (2006.01) |
| C08G 65/22 | (2006.01) |
| C08G 65/333 | (2006.01) |
| C08G 65/335 | (2006.01) |
| C04B 103/30 | (2006.01) |

(52) U.S. Cl.
CPC ............... *C04B 24/32* (2013.01); *C04B 24/243* (2013.01); *C04B 24/246* (2013.01); *C04B 2103/34* (2013.01); *C08G 65/22* (2013.01); *C08G 65/33303* (2013.01); *C08G 65/3353* (2013.01)

(58) Field of Classification Search
None
See application file for complete search history.

(56) References Cited

FOREIGN PATENT DOCUMENTS

| EP | 1136543 | A2 | 9/2001 |
| WO | 94/08913 | A1 | 4/1994 |
| WO | 94/08913 | * | 4/1998 |
| WO | 98/51637 | * | 11/1998 |
| WO | 98/51637 | A1 | 11/1998 |

* cited by examiner

Primary Examiner — Karl J Puttlitz

(74) Attorney, Agent, or Firm — McDermott Will & Emery LLP

(57) ABSTRACT

The invention relates to a compound of following formula (I):

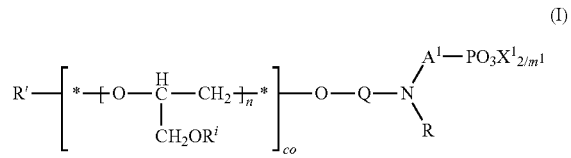

Figure 1:
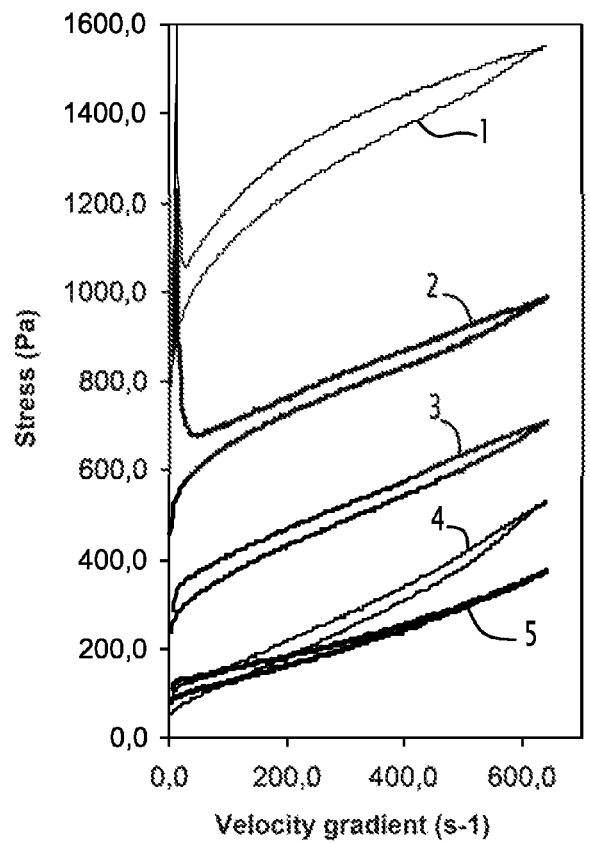

the preparation method thereof and the use of same.

19 Claims, 3 Drawing Sheets

PLASTICIZERS FOR AQUEOUS SUSPENSIONS OF MINERAL PARTICLES AND HYDRAULIC BINDER PASTES

CROSS REFERENCE TO PRIOR APPLICATIONS

This application is a U.S. National Phase application under 35 U.S.C. §371 of International Application No. PCT/FR2010/050614, filed on Mar. 31, 2010 and claims benefit of priority to French Patent Application No. 09 52132, filed on Apr. 2, 2009. The International Application was published in French on Oct. 7, 2010 as WO 2010/112775 A2 under PCT Article 21(2). All of these applications are herein incorporated by reference.

The present invention concerns novel plasticizers for aqueous suspensions of mineral particles and hydraulic binder pastes.

It is known to add dispersants or plasticizers to aqueous suspensions of mineral particles to lower the viscosity thereof or to reduce their water content, in order to reach required values for some applications such as coatings. The suspensions thus thinned can be used for preparing various industrial products including paints, products for coating paper and formulations for rubbers and synthetic resins.

It is also known to add plasticizers to hydraulic binders such as cement, plaster, calcium sulphates or lime, to reduce the water content of the hydraulic binder paste. On this account, the hydraulic binder, after setting, has a denser structure which particularly translates as higher mechanical strength.

As will be fairly easily understood with the particular case of paper coatings, suspensions of mineral particles in general must have low viscosity to facilitate the handling and application thereof, and also the highest possible mineral matter content to reduce the quantity of calorific energy needed to evacuate their aqueous fraction by drying. The obtaining of these qualities under acceptable economic conditions can generally only be brought together when having recourse to plasticizers.

For economic reasons, plasticizers are sought with which it is possible to obtain high-level, stable fluidity with low dosage.

In addition, it is desired to obtain plasticizers which, when used in complex mixtures, do not perturb the properties of the mixture. Therefore in the field of hydraulic binders for example, it is important that the plasticizer does not interfere with the setting process of the hydraulic binder to ensure the obtaining of a product having the required quality.

In the field of compositions for drilling cement, European patent application n° 444 542 proposes using compounds as plasticizers which meet one of the formulas:

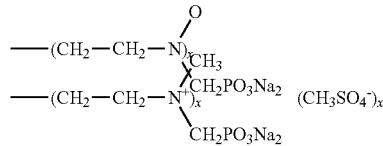

where x is equal to or higher than 10, in order to reduce viscosity to the point where the compositions become pumpable under conditions of turbulent flow. The major drawback of these plasticizers lies in the extremely long delayed setting that they generate. They then have very limited application and can only be used when the desired setting time of the hydraulic binder is relatively short.

Non-polymer plasticizers are also known comprising a polyoxyalkylated chain and an amino-di(alkylene phosphonic) group (French patent FR 269673—and international application WO 94/08913). These plasticizers impart constant viscosity to the suspensions over a time which remains short despite the adding of one or more electrolytes. The polyoxyalkyl chain of these plasticizers does not have any affinity for calcium surfaces.

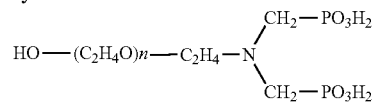

Patent application FR 2892420 describes phosphonated polymers and uses thereof as adjuvants for suspensions of mineral particles and in particular as plasticizers for cement compositions. These polymers, of comb structure, are composed of a main polycarboxylated chain and of polyoxyalkylated and phosphonated side groups linked to the main chain via ester, amide, ether or amine bonds. These dispersants provide a thinning effect both to aqueous suspensions of mineral particles and to hydraulic binder pastes.

It is one of the objectives of the invention to propose novel compounds useful as adjuvants for suspensions of mineral particles and in particular for hydraulic binders. These adjuvants allow good maintaining of the slump flow of hydraulic binders without leading to excessively delayed setting.

The inventors have effectively discovered in an unexpected manner that compounds with at least one phosphonic terminal end containing straight chain polyglycerols are useful in the above-mentioned applications.

According to a first aspect, the invention concerns a compound of following formula (I):

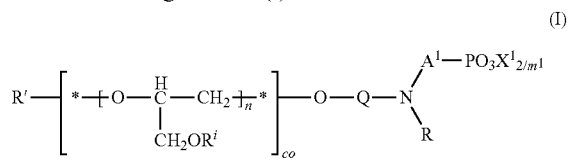

where:
n is an integer of between 1 and 100;
i is an integer varying from 1 to n such that, for each value of i, each $R^i$ represents a hydrogen atom, an alkyl, an aryl, an alkylalkoxy, a $—[CH_2—CH_2—O]_q$-Alk radical where q is an integer from 1 to 20 and Alk represents an alkyl;
R' is a hydrogen or an alkyl;
Q is a straight or branched alkylene group comprising 2 to 10 carbon atoms;
$A^1$ is an alkylene or alkylidene group comprising 1 to 6 carbon atoms, or an arylene group;
$X^1$ is a hydrogen, an alkyl with 1 to 5 carbon atoms or a mono- or divalent cation, in particular an alkaline, alkaline-earth or ammonium cation, such that $m^1$ is 1 when $X^1$ represents a hydrogen, an alkyl with 1 to 5 carbon atoms or a monovalent cation, and $m^1$ is 2 when $X^1$ represents a divalent cation,
R is a hydrogen, an alkyl with 1 to 6 carbon atoms, an aryl or $-A^2-PO_3X^2_{2/m2}$ group where:
$A^2$ is an alkylene or alkylidene group comprising 1 to 6 carbon atoms, or an arylene group,
$X^2$ represents a hydrogen, an alkyl with 1 to 5 carbon atoms or a mono- or divalent cation, in particular an alkaline, alkaline-earth or ammonium cation, such that $m^2$ is 1 when $X^2$ represents a hydrogen, an alkyl with 1 to 5 carbon atoms or a monovalent cation, and $m^2$ is 2 when $X^2$ represents a divalent cation.

The preferred compounds are the compounds of formula (I) where i is 1, 2, 3, 4, 5 or 6 preferably 1, 2 or 3.

In this description, unless indicated to the contrary, the alkyl radicals represent monovalent saturated hydrocarbon radicals, straight or branched chain or cyclic (for example a cyclohexyl radical) with 1 to 8 carbon atoms, preferably 1 to 6 carbon atoms.

As examples of alkyl radicals, particular mention may be made of:
  when they are straight chain, the methyl, ethyl, propyl, butyl, pentyl, hexyl, octyl, nonyl, decyl, dodecyl, tetradecyl, hexadecyl, and octadecyl radicals,
  when branched, the isopropyl, s-butyl, isobutyl and t-butyl groups.

In this description and unless otherwise indicated, the alkylene radicals represent divalent saturated hydrocarbon radicals, straight chain or branched, with 1 to 10 carbon atoms, preferably 1 to 6 carbon atoms. The methylene, ethylene and propylene radicals are particularly preferred.

The alkylidene radicals represent divalent hydrocarbon radicals, straight chain or cyclic, which comprise one or more ethylene unsaturations. Among the alkylidene radicals particular mention may be made of the allylene or vinylene radicals.

In the present description and unless otherwise indicated, the aryl radicals represent mono- or bicyclic hydrocarbon aromatic systems with 6 to 10 carbon atoms. The aryl groups are optionally substituted by one or more alkyl or alkoxy groups, particularly methyl or methoxy. Among the aryl radicals, particular mention may be made of the phenyl or naphtyl radical.

The arylene radicals represent divalent radicals derived from aryl radicals by removal of a hydrogen atom. Phenylene or naphtylene are the preferred arylenes.

A cation is an ion carrying a positive charge. Alkaline cations are cations consisting of alkaline metals and are preferably $Li^+$, $Na^+$, $K^+$ and $Cs^+$. The alkaline-earth cations are cations consisting of alkaline-earth metals and are preferably $Ca^{2+}$ and $Mg^{2+}$. An ammonium cation is a cation comprising a nitrogen atom carrying a positive charge. The ammonium cation corresponds:
  either to the protonated form of an amine function, which may be primary (the corresponding amine is then ammonia or methylammonium for example), secondary (the ammonium cation is then dimethylammonium, diethylammonium or piperidinium for example), tertiary (the ammonium cation is then trimethylammonium or triethylammonium for example) or aromatic (the ammonium cation is then pyridinium for example or an imidazolium ion),
  or to a quaternary ammonium cation e.g. an tetraalkyl ammonium By <<co>>, it is meant that the sequence of the consecutive units of the polymer is unspecified (for example the arrangement may be in blocks, alternated or statistical).

By <<*>>, it is meant that the different units may be grouped together in any order, each unit generally being grouped head-to-tail.

The preferred alkylalkoxy radicals are 1-(1-alkylalkoxy), preferably 1-(ethoxy-1-ethyl).

Preferably, in all the formulas of the compounds of the invention, each $R^i$ of the compounds of the invention each independently represents a hydrogen, a methyl, an ethyl, an aryl, $-CH(CH_3)-OCH_2CH_3$, $-[CH_2-CH_2-O]_q-CH_3$ where q is an integer from 1 to 20, preferably from 1 to 5.

In one preferred embodiment, in the above-mentioned formula (I), R represents a $-A^2$-$PO_3X^2_{2/m2}$ group and the compound has the following formula (II):

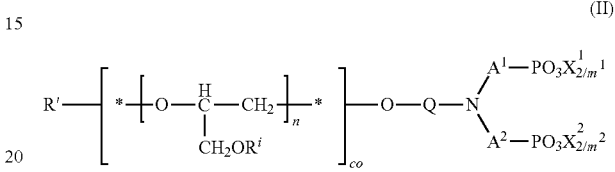

where:
n, i, $R^i$, R', Q, $X^1$, $X^2$, $m^1$ and $m^2$ are such as defined above, and
$A^1$ and $A^2$ each independently represent an alkylene or alkylidene group comprising 1 to 6 carbon atoms, or an arylene group.

The nitrogen atom of the compounds of formula (II) therefore carries two phosphonic functions, the same or different.

Preferably, for the compounds of formula (II) and all the compounds of the invention comprising $A_1$ and $A_2$ groups, $A_1=A_2$. The symmetric compounds are effectively easier to synthesize. In addition, the compounds having a terminal group, a di-phosphonic terminal group are more efficient than their mono-phosphonic homologues in terms of calcium surface thinning, in particular regarding suspensions of calcium carbonate. The phosphoric function effectively has a strong affinity for calcium surfaces. This affinity can be accounted for by the fact that in aqueous phase dispersions of calcium salts (e.g. calcium carbonate), the non-solubilized calcium salts are in equilibrium with their soluble ions. In the vicinity of the surface of the non-solubilized calcium salts, there are calcium ions for which the terminal phosphonic function of the formula (I) compounds has very strong affinity. The compounds of formula (II) carrying two phosphonic functions therefore have an even stronger affinity for calcium surfaces.

In one embodiment, in the above-mentioned formula (I), i represents 2, and the compound has the following formula (III):

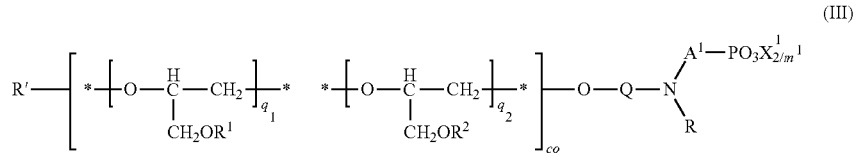

where:
R', $A^1$, R, Q, $X^1$ and $m^1$ are such as defined above,
$R^1$ and $R^2$ meet the definition given for $R^i$,
$q_1$ and $q_2$ each independently represent an integer of 0 to 100, on the understanding that the sum of $q_1$ and $q_2$ equals n, n being such as defined above.

When $q_1$ or $q_2$ equal 0, the compound comprises a single glycerol derivative (only one unit in the oligomer). When $q_1$ and $q_2$ are both different from 0, the compound comprises two glycerol derivatives (two repeat units in the oligomer).

In one embodiment, in above-mentioned formula (III), R is an $-A^2-PO_3X^2_{2/m2}$ group and the compound has the following formula (IV):

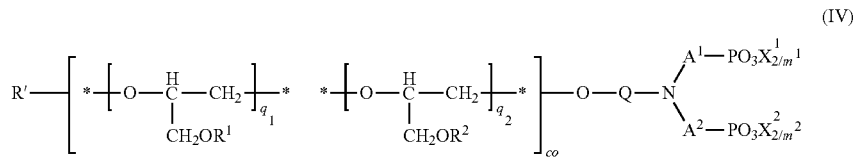

where:
 $R'$, $A^1$, $A^2$, $Q$, $X^1$, $X^2$, $m^1$ and $m^2$ are such as defined above,
 $R^1$ and $R^2$ meet the definition given for $R^i$,
 $q_1$ and $q_2$ each independently represent an integer of 0 to 100, on the understanding that the sum of $q_1$ and $q_2$ equals n, n being such as defined above.

In one embodiment, in the above-mentioned formula (I), i represents 1 and the compound has following formula (V):

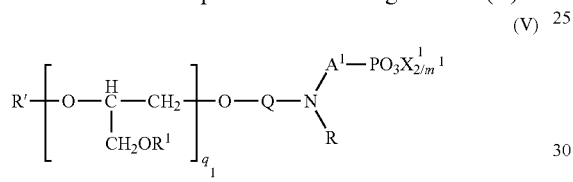

where $n_1$, $R^1$, $R^3$, $Q$, $A^1$, $R$, $X^1$ and $m^1$ are such as defined above.

In one embodiment, in the above-mentioned formula (V), R represents an $-A^2-PO_3X^2_{2/m2}$ group and the compound has following formula (VI):

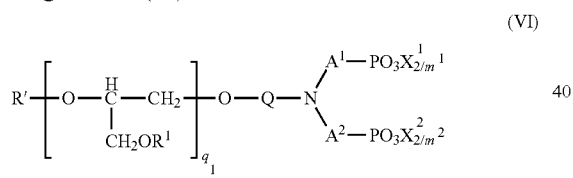

where $n_1$, $R^1$, $R^3$, $Q$, $A^1$, $A^2$, $X^1$, $X^2$, $m^1$ and $m^2$ are such as defined above.

In one embodiment, in the above-mentioned formula (III), $A^1$ represents a $-CH_2-$methylene group and the compound has following formula (VII):

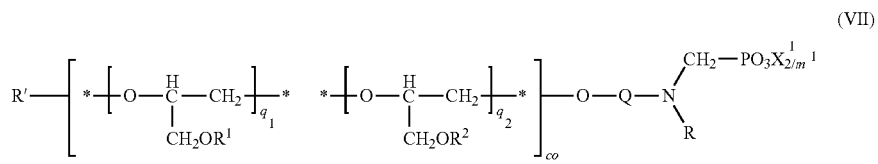

where:
 $R'$, $Q$, $X^1$, $R$ and $m^1$ are such as defined above,
 $R^1$ and $R^2$ meet the definition given for $R^i$,
 $q_1$ and $q_2$ each independently represent an integer from 0 to 100, on the understanding that the sum of $q_1$ and $q_2$ equals n, n being such as defined above.

In one embodiment, in above-mentioned formula (VII), R is a $-CH_2-PO_3X^2_{2/m2}$ group and the compound has the following formula (VIII):

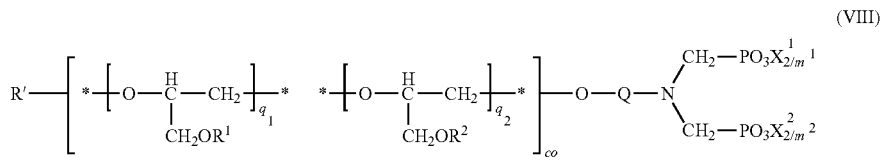

(VIII)

where:
R', Q, $X^1$, $X^2$, $m^1$ and $m^2$ are such as defined above,
$R^1$ and $R^2$ meet the definition given for $R^i$,
$q_1$ and $q_2$ are each independently an integer from 0 to 100, on the understanding that the sum of $q_1$ and $q_2$ equals n, n being such as defined above.

In one embodiment, in above-mentioned formula (VII), Q is a —$CH_2$—$CH_2$— ethylene group and the compound has following formula (IX):

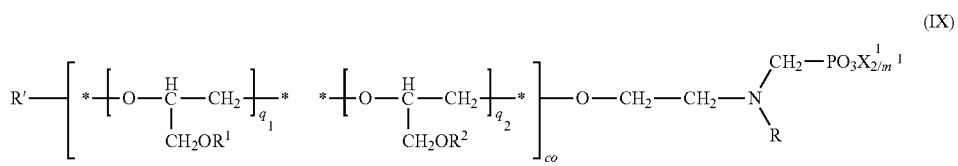

(IX)

where:
R', $X^1$, R and $m^1$ are such as defined above,
$R^1$ and $R^2$ meet the definition given for $R^i$,
$q_1$ and $q_2$ are each independently an integer of 0 to 100, on the understanding that the sum of $q_1$ and $q_2$ equals n, n being such as defined above.

In one embodiment, in above-mentioned formula (IX), R is a —$CH_2$—$PO_3X^2_{2/m2}$ group and the compound has the following formula (X):

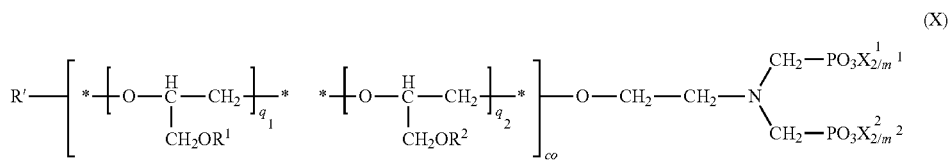

(X)

where:
R', $X^1$, $X^2$, $m^1$ and $m^2$ are such as defined above,
$R^1$ and $R^2$ meet the definition given for $R^i$,
$q_1$ and $q_2$ are each independently an integer of 0 to 100, on the understanding that the sum of $q_1$ and $q_2$ equals n, n being such as defined above.

The invention also concerns the compounds of following formulas (XI), (XII), (XIII) and (XIV):

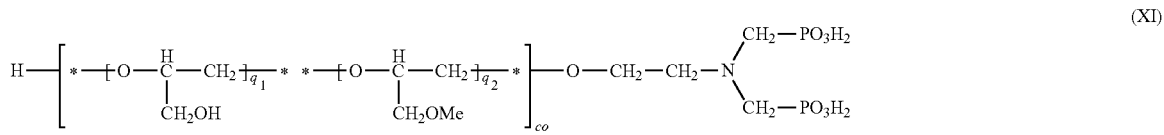

(XI)

-continued

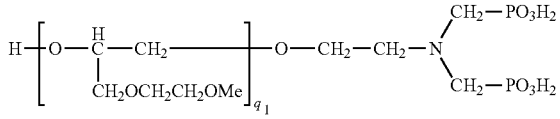
(XII)

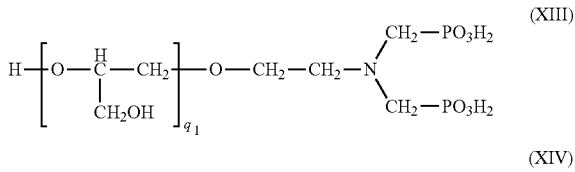
(XIII)

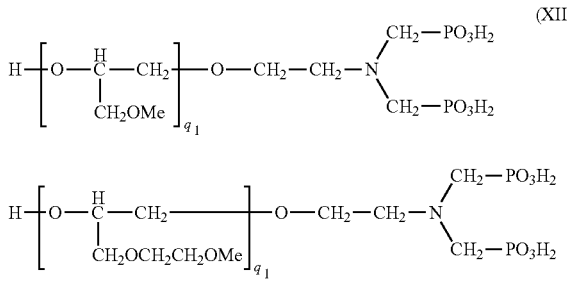
(XIV)

where $q_1$ and $q_2$ are each independently an integer of 0 to 100, on the understanding that the sum of $q_1$ and $q_2$ equals n, n being such as defined above.

According to a second aspect, the invention concerns a method for preparing a compound of formula (I) such as defined above, comprising the steps of:
- (co)polymerizing in a basic medium at least one ether of glycidol in the presence of an anionic initiator carrying a primary amine function, to obtain a polyglycerol with a primary amine terminal end,
- converting the primary amine function of the polyglycerol obtained at the preceding step to an amino-alkylene phosphonic group.

By <<(co)polymerization>>, it is meant to designate both a polymerization reaction and a copolymerization reaction. Therefore, when a single ether of the glycidol is used, polymerization (or homopolymerization) takes place and a polymer comprising the same repeat unit derived from glycerol is obtained. When at least two ethers of glycidol are used, copolymerization takes place and a copolymer comprising several types of repeat units is obtained (as many different repeat units as there are different glycerols used). The distribution of the units derived from different monomers in the copolymer obtained may be statistical (for example by reaction of a mixture of glycidol ethers) or in blocks (for example by sequential adding of glycidol ethers).

By <<basic medium>> is meant a medium whose pH is higher than 7, generally higher than 10.

The use of glycidol ether(s) has the advantage of leading to polymers having a regular structure since the hydroxyl function of the glycidol is protected during polymerization. The anionic polymerization of glycidol leads to products having a highly branched structure rather than to a straight chain, regular polyglycidol subsequent to the involvement of the hydroxyl group in secondary exchange reactions between the alcohol functions and alcoholate groups.

Some glycidol ethers are commercially available, such as 1-methoxy-2,3-epoxypropane (glycidyl methyl ether) marketed by TCI Europe®. Glycidol ethers can also be prepared by following the procedures described below.

For example, in one embodiment, the above-described method for preparing the compound of formula (I) further comprises a prior step for preparing the said glycidol ether from a compound of following formula (XX):

(XX)

where Y is —OH, an alkylsulphonate or a halogen, preferably a chlorine.

By halogen is meant a chlorine, fluorine, bromine or iodine.

The choice of the Y group in formula (XX) allows glycidol ethers of different types to be obtained.

Therefore, to synthesize a glycidol ether of formula:

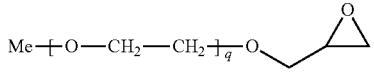

it is possible in particular to use as starting product a compound of formula (XX) in which Y represents a halogen. The (XX) compound in which Y represents a chlorine corresponds to epichlorhydrine. The step for preparing the glycidol ether therefore consists of the reaction between the compound of formula (XX) where Y represents a halogen and an anion of following formula (XXI):

$$M^+,\,^-O—[CH_2—CH_2—O]_q—CH_3 \quad (XXI)$$

where q is an integer of 1 to 20, preferably 1 to 5, and M is an alkaline metal. This reaction is illustrated by the following scheme

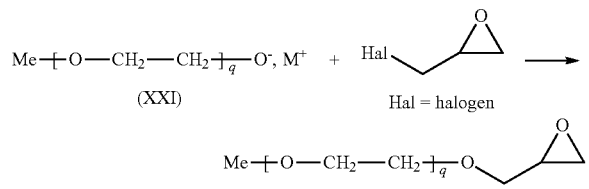

Preferably the afore-mentioned reaction is conducted with epichlorhydrine and:
- either monomethyl ethylene glycol,
- or monomethyl bis(ethylene glycol),
- or monomethyl tri(ethylene glycol)

in the presence of a base (in situ generation of an anion of above-mentioned formula (XXI) respectively with q=1, 2 or 3).

Also, for the synthesis of 1-ethoxy-1-ethylglycidyl ether, it is possible in particular to use as starting product a compound of formula (XX) where Y represents —OH. The step for preparing the glycidol ether then consists of the reaction between the compound of formula (XX) where Y represents —OH and the ethylvinylether. The compound of formula (XX) where Y represents —OH is glycidol, which has the advantage of being commercially available in large quantities.

The reaction of glycidol to obtain 1-ethoxy-1 ethylglycidyl ether described by FITTON [Synthesis 1140 (1987)] is conducted with excess ethylvinylether in the presence of a catalytic quantity of para-toluene sulphonic acid at a temperature lower than 40° C.

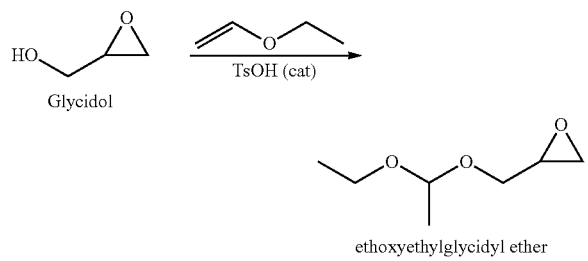

The implementation of the method of the invention starting from 1-ethoxy-1 ethylglycidyl ether is advantageous since the side acetal bond obtained in the compound of formula (I) according to the invention (i.e. $R^i$=—CH(CH$_3$)—O-Et) can be cleaved in an acid medium to yield side alcohol functions ($R^i$=—H), for example by following the protocol described in <<Chimie Organique Avancée>> by F. A. CAREY-R. J. SUNDBERG-M. MOTTET page 442 (1998) (Publisher: De BOECK).

In one embodiment, the afore-mentioned method for preparing the compound of formula (I) further comprises a prior step to prepare the compound of formula (XX) where Y represents —OH starting from glycerol carbonate or a methyl ether of glycerol carbonate such as described in Green Chem., 2008, 10, p. 16).

The method according to the invention advantageously allows the use of derivatives of glycerol (glycidol ether, glycerol carbonate, methyl ether of glycerol carbonate, glycidol, epichlorhydrine). Glycerol is one of the main sub-products of oleochemistry and essentially derives from the conversion of fats and oils and other fatty acids.

By <<initiator>> is meant a chemical species capable of initiating the polymerization reaction. Under the invention, the initiator is a chemical species capable of reacting with the epoxide function of glycidol ether, thereby causing opening of the epoxide ring and the creation of an alcoholate function which can then react on the epoxide function of a second glycidol ether (propagation).

In one preferred embodiment of the method for preparing a compound of above-mentioned formula (I), the anionic initiator carrying a primary amine function is an aminoalcoholate, preferably an alkaline aminoalcoholate. In general, the aminoalcoholate has the formula $^-$O-Q-NH$_2$, where Q is such as defined above. The preferred aminoalcoholates are the alcoholates of methanolamine, of ethanolamine or of propan-3-olamine.

The aminoalcoholates can be obtained from an aminoalcohol contacted with a base, generally chosen so that it is able to convert quantitatively the alcohol functions to alcoholate functions at ambient temperature in a suitable solvent. The bases used may be alkaline hydroxides, alkaline alcoholates or alkaline hydrides (in particular potassium or sodium hydride). The contacting of the aminoalcohol with the base is generally conducted at temperatures of between –80 and 100° C., in particular from –15° C. to 25° C.

During the (co)polymerization reaction, the solvent is preferably chosen from among those solvents capable of chelating the alkaline cations of the alcoholate functions. Solvents which are particularly suitable are tetrahydrofuran, diglyme (diethylene glycol dimethyl ether), dimethylsulfoxide or hexamethylphosphoramide. The reaction can also be carried out without a solvent.

The (co)polymerization reaction of at least one ether of the glycidol is preferably conducted in an anhydrous atmosphere to prevent the adding of water to the reaction medium, which would generate the alcohol functions (opening of the epoxides of the glycidol ethers) and would therefore perturb the polyaddition reaction. For such purpose, it is possible to operate under nitrogen, under argon or under any other gas inert with respect to the reaction medium. For synthesis without a solvent, the reaction can also be carried out in a vacuum.

In one preferred embodiment of the method for preparing a compound of above-mentioned formula (I), (co)polymerization is conducted at a temperature of between –80 and 300° C., in particular between 0 and 200° C., preferably between 15 and 100° C.

The duration of the (co)polymerization reaction is dependent upon the operating mode followed and can be determined by monitoring with nuclear magnetic resonance.

In general, to terminate the (co)polymerization reaction, the product obtained is neutralized or functionalized by fixing on each terminal oxygen atom ((co)polymerization termination step):
  a polyglycerylated chain (adding of repeat units to the oligomer),
  a hydrogen atom (i.e. R'=H in formula (I)) or
  an alkyl radical (i.e. R' represents an alkyl group in formula (I)).

It is therefore possible to add a polyglycerol, to acidify the reaction medium for fixing a proton, or to add an alkylation agent e.g. dimethylsulfate or methyl iodide to achieve methylation (R'=Me in formula (I)). However, the agent used to conduct alkylation and the experimental conditions must be chosen taking into account the presence of the terminal amine function so as not to perform any N-alkylation.

The completion of this (co)polymerization step gives access to a polyglycerol having a primary amine termination of following formula (XXII):

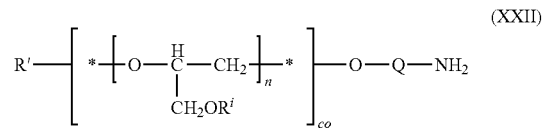

where n, i, $R^i$, R', Q are such as defined above. The polyglycerol obtained carries side ether or acetal functions.

The conversion of the primary amine function of the formula (XII) polyglycerol to an amino-alkylene phosphonic group for preparing the compound of formula (I) differs depending upon the type of X group in the formula (I) compound.

In the embodiment of the method for preparing the compound of formula (I) in which X is a hydrogen or a cation, the conversion of the primary amine function of the polyglycerol to an amino-alkylene phosphonic group is carried out by Moedritzer-Irani reaction optionally followed by a basification step. The protocols described in Kurt MOEDRITZER, Riyad R. IRANI J. Org. Chem. 1966 31 (5) p 1603-1607 in particular can be used.

In the embodiment of the method for preparing the compound of formula (I) in which X is an alkyl with 1 to 5 carbon atoms, the conversion of the primary amine function of the polyglycerol to an amino-alkylene phosphonic group is conducted using the Kabashnick-Fields reaction, optionally followed by a neutralization step. The protocols described in R. A. CHERKASOV V. I. GALKIN Russ. Chem. Rev. 1998 67 857-882 in particular can be followed.

The conversion of the primary amine function of the polyglycerol of formula (XII) to an amino-alkylene phosphonic group in order to prepare the compound of formula (I) also differs depending upon the type of R group in the formula (I) compound.

To obtain a formula (I) compound in which R represents H or $A^2PO_3X_{2/m2}$, following the experimental conditions of the Moedritzer-Irani and Kabashnick-Fields reactions, a single alkylene phosphonic group (R=H) or two alkylene phosphonic groups ($R=A^2PO_3X^2_{2/m2}$) can be grafted onto the primary amine function of the polyglycerol in formula (XII). More precisely, by increasing the number of reagent equivalents during the Moedritzer-Irani and Kabashnick-Fields reactions and/or the temperature, this promotes the grafting of two alkylene phosphonic groups.

Starting from the formula (I) compound in which R represents H, either N-alkylation or N-arylation then allows a formula (I) compound to be obtained in which R represents an alkyl or an aryl.

According to a third aspect, the invention concerns the adjuvants comprising a formula (I) compound according to the invention.

To facilitate dosage, the adjuvants are generally formulated in solution.

Therefore, the invention concerns an adjuvant comprising 1 to 50% by weight, preferably 5 to 40% by weight, more preferably 10 to 30% by weight of at least one formula (I) compound and an aqueous, alcohol or hydro-alcoholic solvent.

Preferably, the adjuvant comprises an aqueous solvent, generally water. However, the use of another solvent (particularly methanol or ethanol) or a glycol can be envisaged to improve solubilization.

As a variant, the adjuvant comprising the formula (I) compound may also be in dry or powder form.

The adjuvants may additionally comprise other usual additives to suspensions of mineral particles, for example antifoam agents, accelerators, delaying agents, water-repelling agents, de-aerating agents, other dispersants, air entrainment agents or stabilizers of anti-foam agents.

The described adjuvant is useful for thinning suspensions of mineral particles.

The suspensions of mineral particles are particularly suspensions of calcium or calcium sulfate salts, or suspensions of mineral oxides such as titanium dioxide or iron oxide. Once the adjuvant containing the compound of the invention has been added to these suspensions, they can be used for preparing various industrial products including paints, products for coating paper and formulations for rubbers and synthetic resins.

The adjuvant is particularly useful for optimizing the maintained slump flow of hydraulic binders. The slump flow of a material is measured by observing the slump height of a given conical volume of concrete, or the spread diameter of a given conical volume of fresh mortar or self-compacting concrete.

A hydraulic binder is a binder which is formed and sets via chemical reaction with water. As examples of hydraulic binders mention may be made of plaster compositions, calcium sulfates, lime and cement and in particular concrete notably prefabricated and ready-to-use concrete. These concretes may particularly be intended for the construction industry and civil engineering.

The adjuvant allows a reduction in the water content of the hydraulic binder paste. On this account, the hydraulic binder paste, after setting, has a denser structure which translates as higher mechanical strength.

Therefore, according to a fourth aspect, the invention concerns the use of a formula (I) compound as plasticizer for hydraulic binders and suspensions of mineral particles. The invention also concerns the use of a formula (I) compound for maintaining the slump flow of hydraulic binders.

The dosage of the formula (I) compound and hence of the adjuvant to be added to the suspension of mineral particles or to the hydraulic binder is dependent upon the desired properties and envisaged application.

In general for a cement composition, the dosage of adjuvant used is 0.01 to 2% (which corresponds to a dosage of the compound according to the invention of 0.01% to 1.99% relative to the cement composition), the percentage being expressed in weight percentage of dry additive relative to the weight of the binder contained in the cement paste. By way of indication, an efficient dosage of adjuvant for preparing a ready-to-use concrete composition is 0.7 to 1.5% of a 20 weight % formulation of dry extract relative to the weight of the cement.

Without being restricted to any particular theory, the thinning effect of the compounds according to the invention could be accounted for by the presence of repelling forces involved between the compounds of the invention adsorbed on the surface of the mineral particles. More precisely, the compounds of the invention are adsorbed on the surface of the cement particles (bonding between the phosphonic groups and calcium ions). The polyglycerylated chains are deployed around the particles in the aqueous phase, which sets up steric hindrance around the cement particle and prevents the approaching of neighbouring cement particles, and hence flocculation thereof.

FIGURES

FIG. 1 gives the comparison between the yield stresses of cements comprising different adjuvants, at 5 minutes in relation to the velocity gradient (Example 4). Curve 1: without adjuvant-Curve 2: poly (EEGE/GME: 1:1)-Curve 3: poly (GMEE)-Curve 4 poly(GME)-Curve 5: optima 100.

Figure 2:
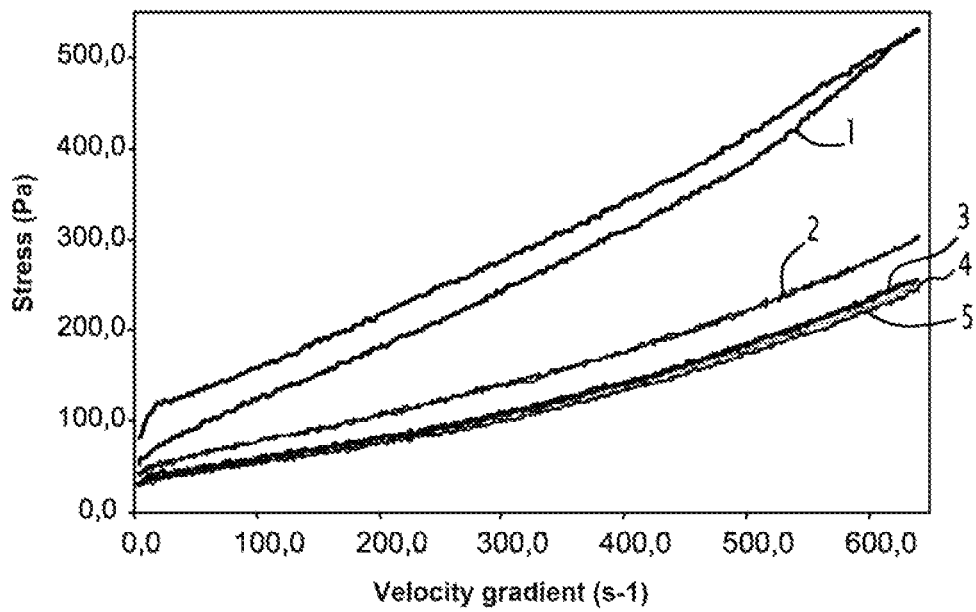

FIG. 2 gives the comparison between the stresses, at different times, of cement containing 1.4 weight % of an adjuvant containing oligo(glycidyl methyl ether) as a function of the velocity gradient (Example 4). Curve 1: time=5 min-Curve 2: time=30 min-Curve 3: time=90 min-Curve 4: time=60 min-Curve 5: time=120 min.

Figure 3:
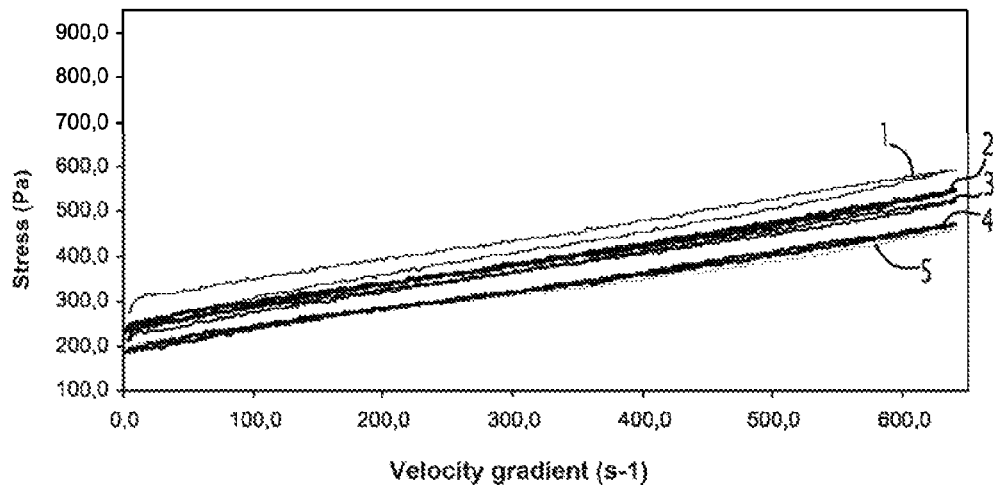

FIG. 3 gives the comparison between stresses at different times of cement containing 0.7 weight % of an Optima 100 adjuvant as a function of the velocity gradient (Example 4). Curve 1: time=5 min-Curve 2: time=120 min-Curve 3: time=90 min-Curve 4: time=30 min-Curve 5: time=60 min.

Figure 4:
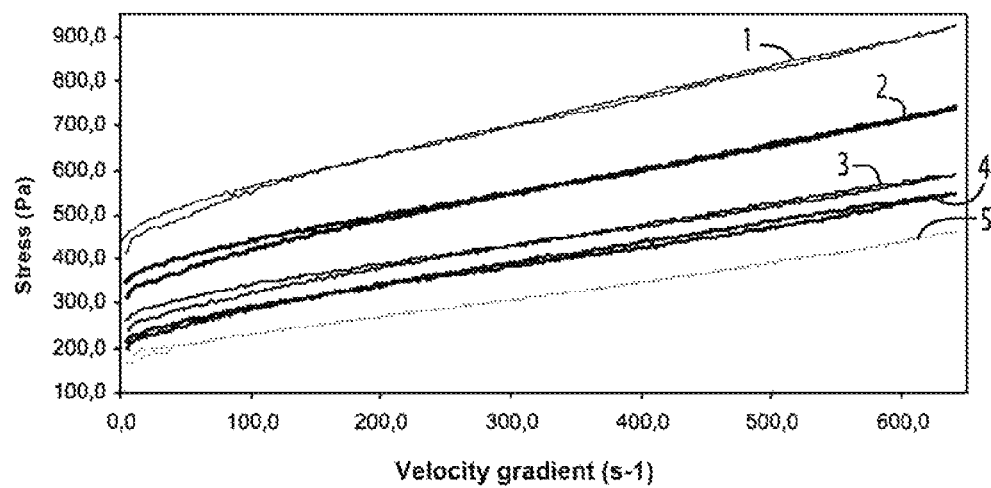

FIG. 4 gives the comparison between stresses, at different times, of the cement containing 0.7 weight % of an adjuvant containing oligo(glycidyl methyl ether) as a function of the velocity gradient (Example 4). Curve 1: time=120 min-Curve 2: time=90 min-Curve 3: time=60 min-Curve 4: time=30 min-Curve 5: time=5 min.

Figure 5:
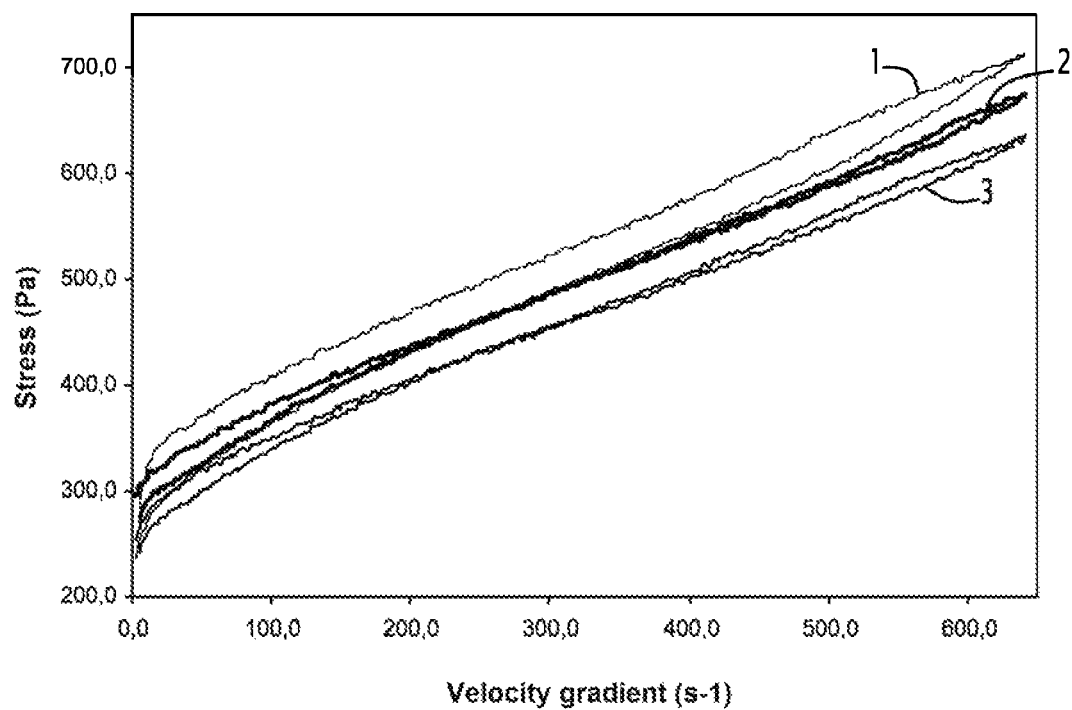

FIG. 5 gives the comparison between stresses, a different times, of the cement containing 1.4 weight % of an adjuvant containing oligo(glycidyl methoxyethyl ether) as a function of the velocity gradient (Example 4). Curve 1: time=5 min-Curve 2: time=60 min-Curve 3: time=30 min.

EXAMPLES

Example 1

Preparation of Glycidol Ethers

Example 1a

Preparation of 1-ethoxy-1 ethylglycidyl ether (EEGE)

1-ethoxy-1 ethylglycidyl ether was obtained by protecting the glycidol with ethyl vinyl ether (EVE): to a 500 ml three-neck flask fitted with a mechanical stirrer and a dropping funnel were added 30 ml of glycidol (0.45 mole) followed by 167 ml of ethyl vinyl ether (1.6 mole). The gradual addition was made of 0.9 g para-toluene sulfonic acid under stirring and maintaining the temperature at below 40° C. The solution was then washed with saturated NaHCO3 solution and the organic phase was dried over $Na_2SO_4$ and then concentrated.

The collected monomer (EEGE) was purified by distillation under reduced pressure ($T_b$=86° C., 28 mm). This protection, when using ethyl vinyl ether, gives access to a side acetal bond which, in an acid medium, will be able to regenerate the hydroxyl function.

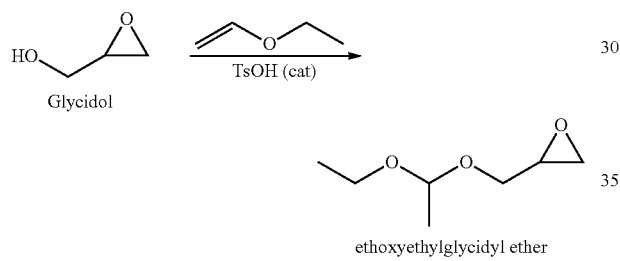

ethoxyethylglycidyl ether

Example 1b

Preparation of glycidyl methyl ether (GME)

Commercial glycidyl methyl ether (GME) (TCI®, purity 85%) was purified by distillation ($T_b$=110-114° C.), then stored 48 h at +5° C. on $CaH_2$ and filtered before use.

Example 1c

Preparation of glycidyl methoxy ethylene ether (GMEE)

In a 250 ml three-neck flask equipped with an isobaric addition funnel surmounted by a nitrogen inlet, with a cooler provided with a bubbler, and with a thermometer, 4.2 g (105 mmol) of sodium hydride (60% in oil) were weighed followed by the addition of 150 ml of anhydrous THF.

The suspension thus obtained was cooled to 0° C., the monomethyl ethylene glycol (7.87 g; 103 mmol; 1 eq.) was added dropwise, and then the reaction medium was held 2 h at ambient temperature. A thick white suspension of alcoholate was obtained.

Epichlorhydrine (ACROS 99%) (40 ml; 500 mmol; 5 eq.) was then added dropwise to the reaction mixture, held an additional 12 h at ambient temperature, then heated 5 h under THF reflux (66° C.).

After return to ambient temperature the reaction medium was neutralized with methanolic sulfuric acid (30% by weight), the resulting suspension dried over $MgSO_4$ then filtered, and the filtrate concentrated under reduced pressure.

The yellow oil thus produced was distilled at 70-75° C. under 8-10 mbar to afford 8.78 g (66 mmol; yield=65%) of the title product (GMEE) in the form of a colourless oil (NMR purity>95%), stored under nitrogen at +5° C.

Example 1d

Preparation of glycidyl methoxy di(ethylenoxy)ether (GMDE)

In a 1 l three-neck flask equipped with an isobaric addition funnel surmounted by a nitrogen inlet, with a cooler provided with a bubbler, and with a thermometer, 12.1 g (300 mmol) of sodium hydride (60% in oil) were weighed to which 450 ml of ahydrous THF were added.

The suspension thus obtained was cooled to 0° C., the monomethyl bis(ethylene glycol) (36 g; 300 mmol; 1 eq.) was added dropwise, then the reaction medium was held 2 h at ambient temperature. A thick white suspension of alcoholate was obtained.

Epichlorhydrine (ACROS 99%) (125 ml; 1.6 mol 5 eq.) was then added dropwise to the reaction medium, held an additional 12 h at ambient temperature, then heated 5 h under THF reflux (66° C.).

After return to ambient temperature, the reaction medium was filtered and the filtrate concentrated under reduced pressure.

The yellow oil thus produced was distilled at 80-90° C. under 1 mbar to afford 33 g (yield=62%) of the title product (GMDE) (NMR purity>95%), stored under nitrogen at +5° C.

Example 1e

Preparation of glycidyl methoxy tri(ethylenoxy)ether (GMTE)

In a 2 l three-neck flask equipped with an isobaric addition funnel surmounted by a nitrogen inlet, with a cooler provided with a bubbler and with a thermometer, 24 g (600 mmol) of sodium hydride (60% in oil), were weighed and 1 L of anhydrous THF was added.

The suspension thus obtained was cooled to 0° C., the monomethyl tri(ethylene glycol) (36 g; 300 mmol; 1 eq.) was added dropwise then the reaction medium was held 10 h at ambient temperature. A thick white alcoholate suspension was obtained.

Epichlorhydrine (ACROS 99%) (240 ml; 3 mol; 5 eq.) was then added dropwise to the reaction medium, held for an additional 12 h at ambient temperature, then heated for 7.5 h under THF reflux (66° C.).

After return to ambient temperature, the reaction medium was filtered and the filtrate concentrated under reduced pressure.

The yellow oil thus produced was distilled at 105-115° C. under 1 mbar and afforded 33 g (yield=62%) of the title product (GMTE), stored under nitrogen at +5° C.

Example 2

(Co)Polymerization Reaction

The homopolymerization and copolymerization reactions of the preceding monomers (GMEE, EEGE ad GME) were conducted in a basic medium using functionalized anionic initiators.

Initiation of the reaction was performed using ethanolamine alcoholates in solution in THF (tetrahydrofuran). Commercial ethanolamine (ACROS®, 98%) was purified by distillation over $CaH_2$ ($T_b$=72-73° C. under 12 mm Hg).

(Co)polymerization gave access to polyglycerol oligomers with primary amine terminal end; under these operating conditions the side acetal function of polyEEGE (polyglycidol blocked by ethyl-vinyl-ether) was not affected and, for all the more reason, the glycerol ethers (GME, GMEE, GMDE and GMTE) were not degraded.

In the following examples, DP symbolizes the degree of polymerization.

Example 2a

Oligomerization of EEGE

Test 1 (DP=14):

To a 500 ml two-neck flask were added 6.7 g (50 mmol) of KH (30 weight % in oil) and 250 ml of anhydrous THF. At 0° C., the freshly distilled ethanol amine (3.1 g, 50 mmoles) was added dropwise. The mixture was left under stirring overnight at ambient temperature. At −50° C., the EEGE was added (50 g, 342 mmoles) and heating applied after return to ambient temperature under reflux (66° C.) for 24 h. After cooling, the medium (brine) was hydrolyzed and extraction conducted using a water-miscible organic solvent, preferably Et2O.

The polyEEGE was obtained in the form of 48 g of a clear yellow oil whose DP was evaluated at 14 by $^1$H NMR.

Test 2 (DP=27):

The following protocol is representative of the protocols used for preparing poly(EEGE)s. Initiation is described starting from ethanolamine. The polymerization reaction was conducted in an inert atmosphere in a 500 ml three-neck flask equipped with a cooler and with addition funnels, in three main stages:

slow addition of ethanolamine (1.83 g, 30 mmol, 1 eq.) to a suspension of potassium hydride (4 g at 30% in oil, 30 mmol, 1 eq.) in THF held at 0° C.;

return to ambient temperature after the addition, and reaction for 12 h at ambient temperature;

cooling to −50° C., addition of EEGE monomer (66 g, 0.45 mol, 15 eq.), return to ambient temperature then heating under THF reflux for 48 h.

The polymerization reaction was halted by adding 10 ml of methanol to the reaction medium previously cooled to ambient temperature. The solvents (THF and methanol) were evaporated in vacuo, the polymer obtained was re-dissolved in 100 ml of diethyl ether, the ether phase washed in 25 ml of water, dried over $MgSO_4$, filtered, concentrated in vacuo. The polymer was then dried under a high vacuum (67 g, quantitative yield). The poly(EEGE) obtained had a degree of polymerization of 27 as determined by $^1$H NMR.

Test 3: Influence of the Type of Base Used for Deprotonating Ethanolamine

Initiation is described started from ethanolamine. The polymerization reaction was conducted in three main stages:

slow addition of ethanolamine (1 eq.) to a suspension either of potassium hydride (1 eq.) or of CsOH (1 eq.) in THF held at 0° C.;

return to ambient temperature on completion of the addition, and reaction for 12 h at ambient temperature;

cooling to −50° C., addition of the EEGE monomer (5 eq.), return to ambient temperature then heating under THF reflux for 12 h.

The polymerization reaction was halted by adding methanol to the reaction medium previously cooled to ambient temperature. The solvents (THF and methanol) were evaporated in vacuo, the polymer obtained was re-dissolved in diethyl ether, the ether phase washed with water, separated, dried over $MgSO_4$, filtered, and concentrated in vacuo. The polymer was then dried under a high vacuum.

The poly(EEGE) obtained had a degree of polymerization of 12 when CsOH was used as base, and of 7 when KH was used as base, as determined by $^1$H NMR (Table).

| Base | DP (estimated by $^1$H NMR) | Weight yield |
| --- | --- | --- |
| CsOH•$H_2O$ | 12 | 86% |
| KH | 7 | 89% |

The degree or polymerization is therefore influenced by the type of base used to deprotonate the ethanolamine, which can be accounted for firstly by the difference in mass between the cations of the $Cs^+$ and $K^+$, bases, and secondly by the stronger or weaker interaction between the alcoholate and its counterion, which has an influence on the nucleophilicity of the initiating alcoholate.

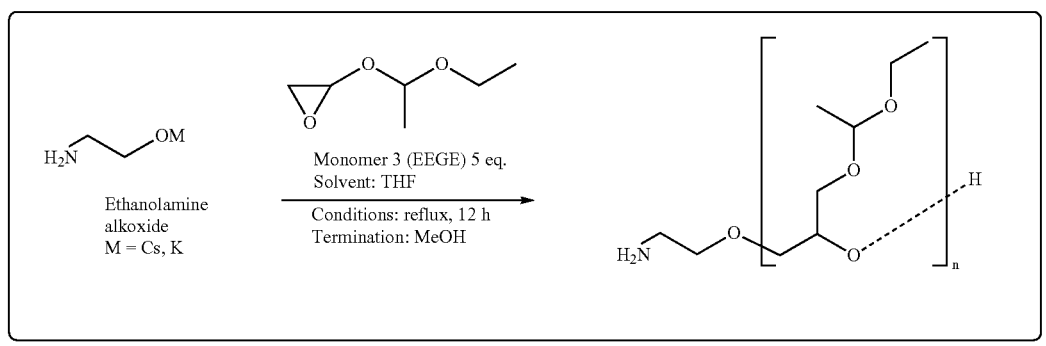

Example 2b

Oligomerization of GME (DP=10)

In a 500 ml three-neck flask equipped with a cooler, an isobaric addition funnel, a nitrogen inlet and outlet bubbler, were weighed 3.47 g (26 mmol; 1 eq.) of potassium hydride (30 weight % in oil). The oil was removed by washes with anhydrous THF (3×15 ml). After the addition of 200 ml anhydrous THF, the suspension obtained was cooled to 0° C.

The ethanolamine (1.65 g; 27 mmol; 1 eq.) was added dropwise to this suspension held at 0° C. under vigorous magnetic stirring. The temperature of the reaction medium was then set at 20° C. and held at this value for 2 hours, after which the desired alkoxide was formed (KH fully consumed, end of hydrogen bubbling).

The temperature of the reaction medium was then lowered to −50° C., and the GME (22.7 g; 257 mmol; 10 eq.) was added dropwise. On completion of the addition, the reaction medium was heated to 66° C. and held under THF reflux for 48 hours.

After return to ambient temperature, the reaction medium was neutralized through the addition of methanolic (50 ml) concentrated sulfuric acid (98%) (1.5 ml), then concentrated by evaporation under reduced pressure. The oil obtained was re-dissolved in ether (200 ml), the ether phase extracted with water (3×200 ml), and the water removed by lyophilization.

The oligomer was thus isolated pure with a quantitative yield (viscous orange oil, 24 g, $DP_n$=10, $M_n$=1000 g/mol).

Example 2c

Oligomerization of GMEE (DP=10)

To a 500 ml three-neck flask equipped with a cooler and an additional funnel were added 3.5 g (26 mmol) of KH (30 weight % in oil) and 200 ml of anhydrous THF. At 0° C., the freshly distilled ethanol amine (1.65 g, 27 mmoles) was added dropwise. The mixture was left under stirring at ambient temperature for 2 h. At −50° C., the GMEE was then added (22.7 g, 257 mmoles) and heated, after return to ambient temperature, under reflux (66° C.) for 44 h. After cooling, the medium was neutralized (methanol $H_2SO_4$). The organic phase was concentrated, re-dissolved and washed with water. After evaporation of the solvents, the polyGMEE appeared in the form of 26 g of an orangish oil and the DP was evaluated at 10 by $^1H$ NMR.

Example 2d

Co-Oligomerization of EEGE/GME (1:1, DP=27)

Copolymerization in the desired proportions of the two monomers glycidyl methyl ether and 1-ethoxy-1-ethylglycidyl ether gave access to block co-oligomers (in two consecutive steps) or statistical co-oligomers (mixture of the two monomers at the start of the reaction). The reaction was conducted under the same conditions as for a single monomer. The yields and purity values reached were comparable with those observed for a single monomer.

Following the same operating mode as described for polyGME, to a three-neck flask were added 3.5 g (26 mmol) of KH (30 weight % in oil) and 300 ml anhydrous THF. At 0° C., the freshly distilled ethanol amine (1.58 g, 26 mmoles) was added dropwise. The mixture was left under stirring at ambient temperature for 2 h. At −50° C., the GME was then added (22 g, 250 mmol) withthe EEGE (36.5 g, 250 mmol) previously mixed in a separating funnel. After return to ambient temperature, heating was applied under reflux (66° C.) for 44 h. After cooling, the medium was neutralized (methanol $H_2SO_4$). The organic phase was concentrated, re-dissolved in ether and laced with water. After evaporation of the solvents, the polyEEGE/GME appeared in the form of 62 g of orangish oil and the DP was evaluated at 27 by $^{13}C$ NMR (the EEGE/GME ratio was maintained).

Example 3

Conversion Reaction of the Primary Amine Function

The following protocol is representative for preparing the diphosphonic pincer according to MOEDRITZER-IRANI.

Example 3a

Conversion of the Primary Amine Function of Poly(GME)

In a 250 mL three-neck flask equipped with a mechanical stirrer, an isobaric addition funnel surmounted by a nitrogen inlet, with a cooler surmounted by an outlet bubbler, 22.3 g (23.5 mmol; 1 eq.) of the poly(GME) oligomer were weighed Phosphorous acid (Janssen® 97%) (5 g; 60 mmol; 2.5 eq.) was added under strong stirring, portion-wise, taking care to control the temperature of the reaction medium (20-25° C.) through the rate of addition (exothermal addition). On completion of the addition, the reaction medium was held under strong stirring at ambient temperature for 24 hours.

After the dropwise addition of 2.5 mL (30 mmol; 1.2 eq.) of concentrated hydrochloric acid (37%), the reaction medium was heated to 100° C. (reflux). As soon as this temperature was reached, the very slow addition (0.8 ml/h) was made using a syringe plunger of 6 mL (60 mmol; 2.5 eq.) of aqueous formaldehyde (37%). The reaction medium was then held at 100° C. under strong stirring for 48 hours.

After cooling, addition of water (250 ml) and extraction, the aqueous phase was washed with ether (100 ml), then the water removed by lyophilization.

The oligomer carrying the bis(phosphonic) pincer ($M_n$=1100 g/mol, $DP_n$=10) was isolated in the form of a viscous orange oil with a good yield and good purity (31 g; traces of residual phosphorous acid).

Example 3b

Conversion of the Primary Amine Function of Poly(EEGE)

The conversion, in an acid medium, of the primary amine function to an N-dimethylene diphosphonic acid group of structure: —$N[CH_2P(O)(OR')_2]_2$ according to the MOEDRITZER-IRANI reaction (where R'=H) or KABASHNICK-FIELDS reaction (where R'=$OC_2H_5$) is accompanied by a hydrolysis reaction of the side acetal groups of the polyEEGE corresponding to deprotection of the hydroxyl groups. A compound of the following formula was therefore obtained:

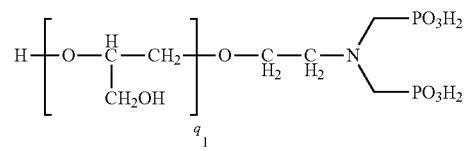

Example 3c

Conversion of the Primary Amine Function of Poly(EEGE/GME)

The MOEDRITZER-IRANI reaction, conducted under the same conditions as in Example 3a) but with the copolymer poly(glycidyl methyl ether-co-1-ethoxy-1-ethylglycidyl ether) obtained in Example 2d), was used to graft the diphosphonic pincer to give access to poly(glycerol-co-glycidyl methyl ether)co-oligomers with diphosphonic termination (structure 2).

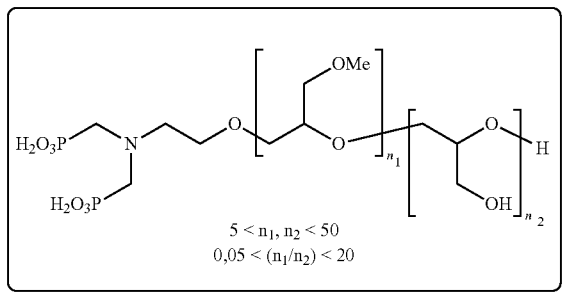

2

Example 4

Use of the Compounds as Plasticizers for Suspensions of Mineral Particles

Preparation of Cement Pastes

The suspension of mineral particles was cement in water. The cement used was CEM I 52,5N CE CP2 NF® factory in Le Havre, with a water/cement ratio of 0.35. The compounds of the invention were diluted in water to a concentration of 20% by weight and their pH was set at a value of between 5 and 6 using sodium hydroxide. An anti air-entrainment additive was also added to eliminate any influence of trapped bubbles on the paste rheology.

Rheological Measurements

Slump flow was evaluated by measuring the spread diameter (diameter formed after pouring) as follows. A conical bottomless mould, reproducing the Abrams cone on a scale of 0.5 (see standard NF 18-451, 1981) having the following dimensions:

| | |
|---|---|
| circle diameter of the upper base | 5 cm |
| circle diameter of the lower base | 10 cm |
| height | 15 cm | was filled with a mortar in three layers of identical volume, and each layer of mortar was rodded 15 times using a steel rod 6 mm in diameter and with spherical end point. The upper surface of the cone was levelled and then the cone was lifted vertically. Slump flow was measured at 5, 30, 60 and 90 minutes across 2 diameters at 90° using a tape measure; The result of slump flow measurement is the mean of the 2 values +/−1 mm. The tests were conducted 20° C.

The cement paste, the mortar or the concrete show fluid behaviour under yield stress: at rest the finest particles undergo attraction forces which organize them into rigid networks which must be broken before pouring. It is generally acknowledged that the fluidity measured by the slump flow test for example is inversely related to the value of the yield stress (namely the minimum shear stress to be applied to cause flow) measured here using a rotational rheometer equipped with a bladed impeller (CONTRAVES RHEOMAT® rheometer 115 with blade geometry). The chosen method was an increasing ramp with shear gradient of 0 to 640 s$^{-1}$.

The effect on the yield stress of the adjuvants listed below was examined:
  cement without adjuvant (reference CEM 1 LH® batch September 2006) reference product;
  with n° 66 (EPB-542-006): co-oligo (glycidol/glycidyl methyl ether: 50:50);
  with n° 70 (EPB-542-008): oligo (glycidyl methoxyethyl ether) ou oligo(GMEE);
  with n° 68 (EPB-542-005): oligo (glycidyl methyl ether) or oligo(GME);
  with Optima 100, product marketed by CHRYSO® (EPB-542-004): different dosages, different times, which allowed the calibration of the compounds according to the invention compared with an existing industrial product having well known properties.

Comparison of Initial Yield Stresses

The stresses measured at 5 minutes are given in FIG. 1 for the five preceding formulations.

Cement alone (CEM 1 LH September 2006) has an initial yield stress (5 nm) of 1000 Pa. The reference dose of adjuvant was fixed at 1.4% expressed in weight of dry additive relative to the weight of the binder contained in the cement paste. The content of formulation additive (anti-foam) being very low, the dose of compound was 1.39% of dry additive relative to the cement. This dose allowed the initial yield stress to be lowered to 100 Pa with Optima 100 (EPB-542-004).

At this dosage of 1.4%, these tests showed that:
  the oligo(GME) [n° 68; EPB-542-005] is in the same range of values as Optima 100 [EPB-542-004],
  the oligo(GMEE) [n° 70; EPB-542-005] allows the initial yield stress to be lowered to 300 Pa,
  the co-oligo(glycidol/glycidyl methyl ether: 50:50) [n° 66; EPB-542-006] only allows a modest decrease in the initial yield stress (650 Pa).

Test with 1.4% and at 2 h of Oligo(Glycidyl Methyl Ether) [N° 68; EPB-542-005]

The good results obtained in terms of lowering the yield stress at 5 nm with n° 68 at the dose of 1.4% prompted us to evaluate this adjuvant over time.

FIG. 2 gives the results up to $t_o+2$ h, in which $t_o$ corresponds to the time when the cement is contacted with water.

At the dose of 1.4% for this adjuvant, the yield stress was 100 Pa after 5 minutes. In addition, the maximum decrease in yield stress was not reached after 5 minutes, or even after 30 minutes. It was only after 1 hour that the minimum yield stress was observed (about 40 Pa). This low yield stress value remained unchanged for an additional 1 hour.

Test with 0.7% at 2 h of Oligo(GME) [No 68; EPB-542-005] and Comparison with Optima 100 [EPB-542-004]

In the light of the good results obtained at the dose of 1.4% with oligo(glycidyl methyl ether) [n° 68e; EPB-542-005], a comparative test with Optima 100 was performed at the lower dose of 0.7%.

The two FIGS. 3 and 4 summarize the results observed with this dose of 0.7% for an experimental time period of 2 hours:
  initial lowering (5 minutes) of the yield stress was better with oligo(GME) (150-200 Pa) than with Optima 100 (250-300 Pa),
  at this dose of 0.7%, the oligo(GME) lost efficiency over time: over a period of 2 hours, the measured yield stress progressively increased from 150-200 Pa to 450-500 Pa,
  on the other hand, Optima 100 only started to lose efficiency after the first hour; in addition over a 2 h range, the yield stress never exceeded 300 Pa.

To summarize, at the dose of 0.7% the results obtained in terms of yield stress with Optima 100 [EPB-542-004] and oligo(GME) [n° 68; EPB-542-005] are comparable during the first half hour. Thereafter, Optima 100 allows better maintained efficiency whilst the oligo(GME) gradually loses efficiency. It is recalled here that this loss of efficiency over time of the oligo(GME) was not observed at the higher dose of 1.4%.

Test at 1.4% Over 1 Hour with Oligo(GMEE) [N ° 70; EPB-542-008]

It was previously pointed out that the oligo(GMEE) tested at the dose 1.4% lowers the initial yield stress (5 minutes) to 300 Pa.

A test conducted over a time of 1 hour showed that this value was maintained for this period of time as indicated in FIG. 5 which summarizes the experiment.

CONCLUSION

The oligo(GMEE) at the dose of 1.4% therefore offers a substantial reduction in yield stress, and good maintained rheology over a 1-hour time period.

The invention claimed is:
1. A compound of following formula (I):

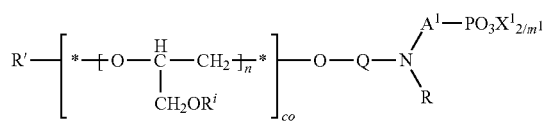

where:
n is an integer of between 1 and 100;
i is an integer varying from 1 to n, such that for each value of i, each $R^i$ independently represents a hydrogen atom, an alkyl, an aryl, a 1-(1-alkylalkoxy), a —[$CH_2$—$CH_2$—O]$_q$-Alk radical in which q is an integer of between 1 and 20, and Alk represents an alkyl,
R' is a hydrogen or an alkyl,
Q is a straight chain or branched alkylene group comprising 2 to 10 carbon atoms,
$A^1$ is an alkylene or alkylidene group comprising 1 to 6 carbon atoms, or an arylene group,
$X^1$ represents a hydrogen, an alkyl with 1 to 5 carbon atoms or a mono- or divalent cation, such that $m^1$ is 1 when $X^1$ represents a hydrogen, an alkyl with 1 to 5 carbon atoms or a monovalent cation, and $m^1$ is 2 when $X^1$ represents a divalent cation,
R represents a hydrogen, an alkyl with 1 to 6 carbon atoms, an aryl or an -$A^2$-$PO_3X^2_{2/m2}$ group where:
$A^2$ is an alkylene or alkylidene group comprising 1 to 6 carbon atoms, or an arylene group,
$X^2$ represents a hydrogen, an alkyl with 1 to 5 carbon atoms or a mono- or divalent, cation, such that $m^2$ is 1 when $X^2$ represents a hydrogen, an alkyl with 1 to 5 carbon atoms or a monovalent cation, and $m^2$ is 2 when $X^2$ represents a divalent cation,
co represents that the sequence of the consecutive units of the polymer is unspecified, and
* represents that the different units are grouped together head-to-tail.

2. The compound according to claim 1, of following formula

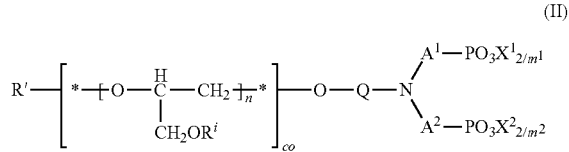

where:
n, i, $R^i$, R', Q, $X^1$, $X^2$, $m^1$ and $m^2$ are such as defined in claim 1, and
$A^1$ and $A^2$ are each independently an alkylene or alkylidene group comprising 1 to 6 carbon atoms, or an arylene group.

3. The compound according to claim 1, wherein each $R^i$ independently represents a hydrogen, a methyl, an ethyl, an aryl, —$CH(CH_3)$—$OCH_2CH_3$, —[$CH_2$—$CH_2$—O]$_q$—$CH_3$ where q is an integer from 1 to 20.

4. The compound according to claim 1, of following formula (III):

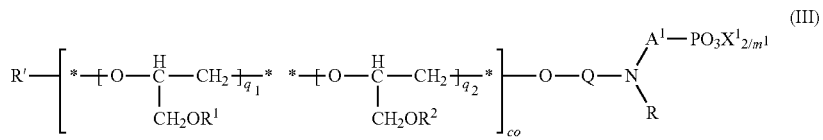

where:
R', $A^1$, R, Q, $X^1$ and $m^1$ are such as defined in claim 1,
$R^1$ and $R^2$ meet the definition given for $R^i$ in claim 1,
$q_1$ and $q_2$ are each independently an integer from 0 to 100, provided that the sum of $q_1$ and $q_2$ equals n, n being such as defined in claim 1.

5. The compound according to claim 1, of following formula (IV):

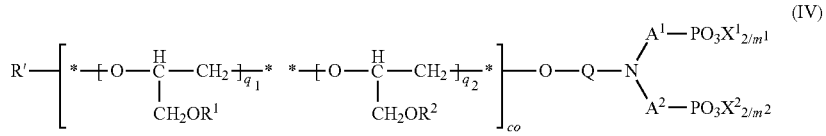

where:
R', $A^1$, $A^2$, Q, $X^1$, $X^2$, $m^1$ and $m^2$ are such as defined in claim 1,
$R^1$ and $R^2$ meet the definition for $R^i$ given in claim 1,
$q_1$ and $q_2$ are each independently an integer of 0 to 100, provided that the sum of $q_1$ and $q_2$ equals n, n being such as defined in claim 1.

6. The compound according to claim 1, of following formula (VI):

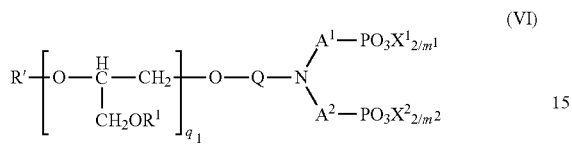

where $n_1$, $R^1$, $R^3$, Q, $A^1$, $A^2$, $X^1$, $X^2$, $m^1$ and $m^2$ are such as defined in claim 1.

7. The compound according to claim 1, of following formula (VIII):

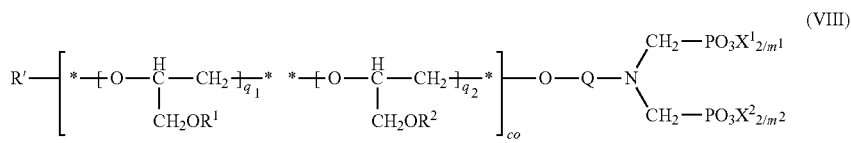

where:
R', Q, $X^1$, $X^2$, $m^1$ and $m^2$ are such as defined in claim 1,
$R^1$ and $R^2$ meet the definition for given in claim 1,
$q_1$ and $q_2$ are each independently an integer of 0 to 100, provided that the sum of $q_1$ and $q_2$ equals n, n being such as defined in claim 1.

8. The compound according to claim 1 of following formula (X):

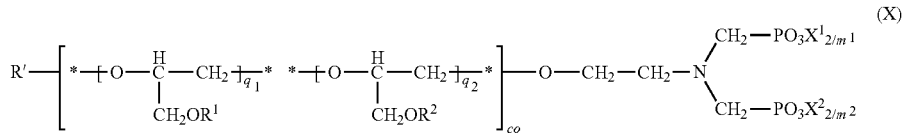

where:
R', $X^1$, $X^2$, $m^1$ and $m^2$ are such as defined in claim 1,
$R^1$ and $R^2$ meet the definition for $R^1$ given in claim 1,
$q_1$ and $q_2$ are each independently an integer of 0 to 100, provided that the sum of $q_1$ and $q_2$ equals n, n being such as defined in claim 1.

9. The compound according to claim 1 having one of the following formulas (XI), (XII), (XIII) and (XIV):

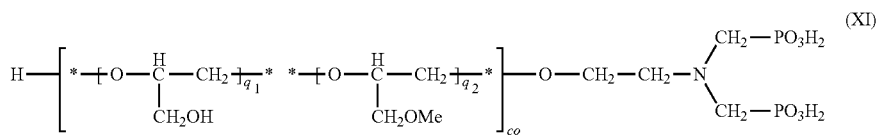

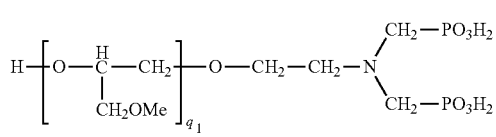

(XII)

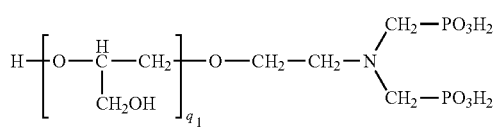

(XIII)

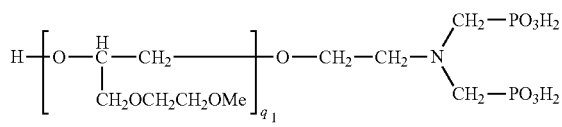

(XIV)

in which $q_1$ and $q_2$ are each independently an integer from 0 to 100, provided that the sum of $q_1$ and $q_2$ equals n, n being such as defined in claim 1.

10. A method for preparing a compound of following formula (I):

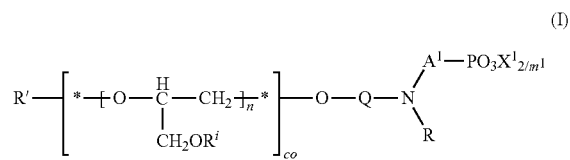

where:
- n is an integer of between 1 and 100;
- i is an integer varying from 1 to n, such that for each value of i, each $R^i$ represents a hydrogen atom, an alkyl, an aryl, a 1-(1-alkylalkoxy), a —[$CH_2$—$CH_2$—O]$_q$-Alk radical where q is an integer of 1 to 20 and Alk represents an alkyl;
- R' represents a hydrogen or an alkyl;
- Q represents a straight chain or branched alkylene group comprising 2 to 10 carbon atoms;
- $A^1$ independently represents an alkylene or alkylidene group comprising 1 to 6 carbon atoms, or an arylene group;
- $X^1$ is a hydrogen, an alkyl with 1 to 5 carbon atoms or a mono- or divalent cation, such that $m^1$ is 1 when $X^1$ represents a hydrogen, an alkyl with 1 to 5 carbon atoms or a monovalent cation, and $m^1$ is 2 when $X^1$ represents a divalent cation;
- R represents a hydrogen, an alkyl with 1 to 6 carbon atoms, an aryl or a-$A^2$-$PO_3X^2_{2/m2}$ group where:
  - $A^2$ represents an alkylene or alkylidene group with 1 to 6 carbon atoms, or an arylene group,
  - $X^2$ represents a hydrogen, an alkyl with 1 to 5 carbon atoms or a mono- or divalent cation, such that $m^2$ is 1 when $X^2$ represents a hydrogen, an alkyl with 1 to 5 carbon atoms or a monovalent cation, and $m^2$ is 2 when $X^2$ represents a divalent cation,
- co represents that the sequence of the consecutive units of the polymer is unspecified, and
- * represents that the different units are grouped together head-to-tail;

comprising the steps of:
- (co)polymerizing in a basic medium at least one ether of glycidol in the presence of an anionic initiator carrying a primary amine function having the formula of —O-Q-$NH_2$ to obtain a polyglycerol with primary amine termination,
- converting the primary amine function of the polyglycerol obtained at the preceding step to an amino-alkylene phosphonic group.

11. The method for preparing a formula (I) compound according to claim 10 further comprising a prior step to prepare the said glycidol ether from a compound of following formula (XX):

(XX)

where Y is —OH, an alkylsulfonate or a halogen.

12. The method for preparing a formula (I) compound according to claim 10, wherein X is a hydrogen or a cation and the conversion of the primary amine function of the polyglycerol with primary amine termination to an amino-alkylene phosphonic group is conducted by Moedritzer-Irani reaction, optionally followed by a basification step.

13. The method for preparing a formula (I) compound according to claim 10, wherein X is an alkyl with 1 to 5 carbon atoms and the conversion of the primary amine function of the polyglycerol with primary amine termination to an amino-alkylene phosphonic group is conducted by Kabashnick-Fields reaction, optionally followed by a neutralization step.

14. An adjuvant comprising 1 to 50 weight % of at least one compound according to claim 1 and an aqueous, alcoholic or hydro-alcoholic solvent.

15. A method for maintaining the slump flow of hydraulic binders and suspensions of mineral particles comprising a step of adding the compound according to claim 1 to a hydraulic binder or to a suspension of mineral particles.

16. The compound according to claim 1, wherein $X^1$ represents an alkaline, alkaline-earth or ammonium cation, and/or $X^2$ represents an alkaline, alkaline-earth or ammonium cation.

17. The compound according to claim 3, wherein q is an integer from 1 to 5.

18. The compound according to claim 10, wherein $X^1$ represents an alkaline, alkaline-earth or ammonium cation, and/or $X^2$ represents an alkaline, alkaline-earth or ammonium cation.

19. The method for preparing a formula (I) compound according to claim 11, wherein Y is chlorine.

* * * * *